Figure 3:
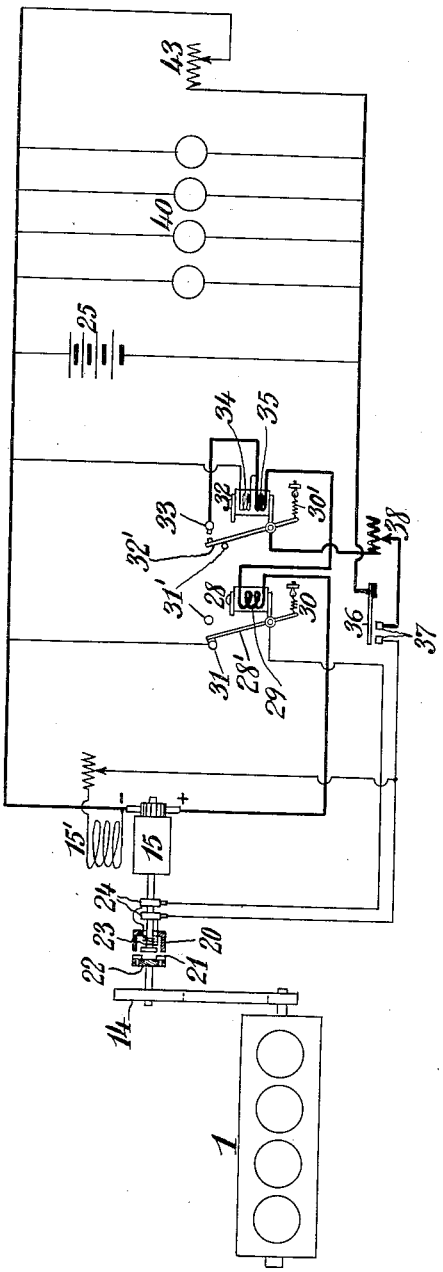

H. W. LEONARD.
METHOD OF CONTROLLING ELECTRIC ENERGY.
APPLICATION FILED APR. 16, 1913.
1,122,774.
Patented Dec. 29, 1914.
2 SHEETS—SHEET 1.
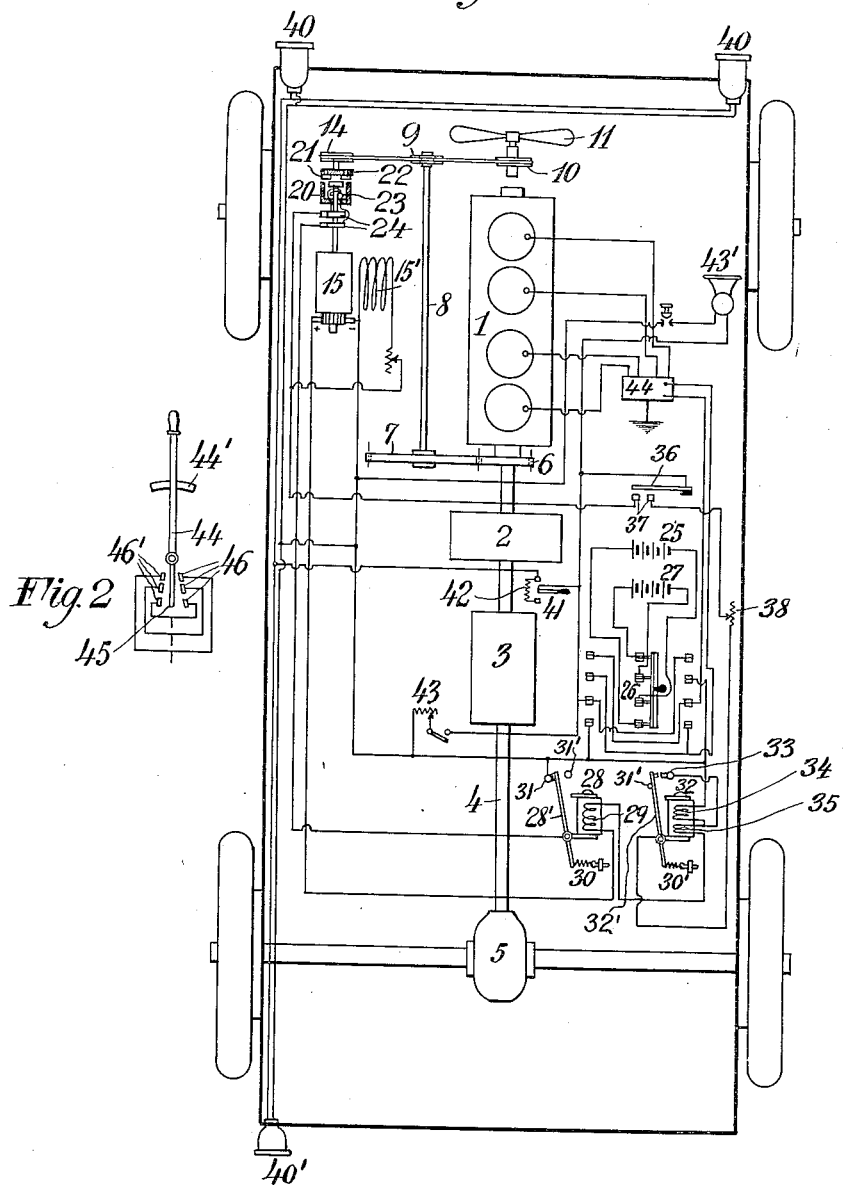

H. W. LEONARD.
METHOD OF CONTROLLING ELECTRIC ENERGY.
APPLICATION FILED APR. 16, 1913.

1,122,774.

Patented Dec. 29, 1914.
2 SHEETS—SHEET 2.

UNITED STATES PATENT OFFICE.

HARRY WARD LEONARD, OF BRONXVILLE, NEW YORK.

METHOD OF CONTROLLING ELECTRIC ENERGY.

1,122,774.  Specification of Letters Patent.  Patented Dec. 29, 1914.

Original application filed January 18, 1910, Serial No. 538,762. Divided and this application filed April 16, 1913. Serial No. 761,442.

*To all whom it may concern:*

Be it known that I, HARRY WARD LEONARD, a citizen of the United States of America, residing at Bronxville, in the county of Westchester and State of New York, have invented certain new and useful Improvements in Methods of Controlling Electric Energy, of which the following is a full, clear, and exact specification.

My invention relates to methods of generating and controlling electric energy, and although particularly well adapted for use in motor vehicles, my invention is likewise applicable in other instances, as will more fully appear from the following description.

This application is a division of my application Serial Number 538,762, electric apparatus for motor vehicles, filed January 18, 1910, which latter application is directed to certain embodiments for self-propelled vehicles, whereas the present application is particularly directed to my invention as applied to the charging of storage batteries and the automatic supply of energy from a variable speed armature to a work circuit comprising a storage battery and incandescent lamps in parallel.

One object of this invention is to secure efficient and reliable actuation, and at the same time obtain a desired automatic control in response to certain conditions by controlling a dynamically generated electric current which in turn controls the production of said dynamically generated energy. I preferably employ a magnetic winding which controls the energy generated and in my preferred form, the automatic control of the current in said magnetic winding is dependent upon electrical conditions in the circuit in which the electric energy is utilized. In one embodiment of my invention the magnetic winding is the winding of a magnetic clutch connected across the dynamo armature in parallel with the work circuit. But any other suitable and known form of magnetic winding may be employed so long as it is in shunt to the dynamo armature and is adapted to have its energizing current automatically controlled by the amperes in the work circuit to control the generation of energy by the dynamo armature in accordance with my invention. By way of illustration merely and without intending to be limited to the details thereof, I point out that one such form of magnetic winding controlled automatically by the current dynamically produced in the work circuit has been disclosed by me in my Patent No. 1,043,777 patented November 5, 1912 upon an application originally filed March 2, 1903.

My invention is particularly useful for the purpose of automatically charging a storage battery from a source of mechanical energy in which the speed of the driving element varies over a wide range, such as the charging of a storage battery from the prime motor on a gasolene motor car, or other vehicle. With a system arranged in accordance with my invention, the storage battery on such a car may be utilized for operating incandescent lamps for head lights, etc.; also for operating an electric horn; also for supplying the energy for producing low tension or high tension ignition in the cylinders of the gas engine; also for operating electric heaters or electrically heated tools, such as an electric vulcanizer; also for operating electric motors, such as a self-starter for the gas engine or for operating an air compressor; also for producing electric signals, such as by any suitable wireless system, and in general for using the energy of such a storage battery or the energy from the generating dynamo for any of the many uses to which it is adapted.

My invention accomplishes the objects in a simple, economical and reliable manner and secures various other advantages which will be understood from the following description by those skilled in the art.

Referring to the accompanying drawing, Figure 1 is a diagram illustrating one form of my invention applied to a gasolene motor car and showing the various circuit connections of the apparatus; Fig. 2 is a detail view illustrating a modified arrangement of the circuit closing switch in which the latter is arranged to be controlled by the operation of the change gear lever; and Fig. 3 is a simplified diagram illustrating certain of the apparatus and connections disclosed in Fig. 1, various parts being omitted for clearness; it is to be understood that no attempt has been made in this figure to show such a driving ratio between the engine and the dynamo or such proportions of parts of other apparatus as may be desirable in practical construction, the figure being merely to show in simple form a diagram of connections.

Referring to Fig. 1, an outline of a motor car is indicated in a general way having the gas engine 1, the clutch 2, the change gear box 3, the driving shaft 4, and the rear axle equalizing gear box 5. On the engine shaft is shown a gear 6 which drives a larger gear 7 for driving the usual counter-shaft 8, which in turn operates the engine valves and other devices as is customary, the speed of the counter-shaft being one-half that of the engine shaft in the usual type of gas engines. On the shaft 8, is mounted a driving pulley 9, over which passes a driving belt which serves to drive the pulley 10 and its shaft which carries the cooling fan 11. After passing over the pulley 10, the belt also passes over a third pulley 14 mounted to revolve on a shaft suitably supported in bearings. The driving pulley 9 thus drives the cooling fan as well as the pulley 14, which latter forms the driving means for the magnetic clutch and electric generator 15. In order to insure a proper amount of tension of the driving belt and for insuring a large peripherial contact of the belt upon the pulleys 10 and 14, I may use an idler engaging the upper portion of the belt between the pulleys. This idler is carried by two slotted arms pivotally supported upon a counter-shaft at their lower ends. The bearings of the idler are adapted to move vertically in the slotted portion of the arms, and to each movable bearing at opposite sides of the arms is secured a spring, the lower end of which is secured to a lug on the side of the arm and adjustable therein by means of a nut, this adjustability securing still further means for varying the tension of the driving belt.

The magnetic clutch is shown of the iron-clad type, one element 20 having a cylindrical outer portion and a central core extending from one end as indicated in Fig. 1. The other element of the magnetic clutch comprises the circular non-magnetic plate 22, fixed upon and rotating with its supporting shaft which also carries the pulley 14. There are a number of perforations in the plate 22 in which are armatures 21 in the form of pieces with enlarged heads, which heads are large enough to bridge the space between cylinder 20 and its central core. The perforations are large enough to allow the armatures to be axially movable freely so that when these armatures are attracted by the other element of the clutch, the magnetic force and the frictional engagement between the faces of the armature and main element of the clutch will be sufficient to drive by means of said armatures the clutch element 20 and the generator 15 which are fixed to the same shaft. When the clutch is not magnetized, the pulley 14 and the plate 22 carrying the iron armatures 21 rotate freely together without driving the clutch element 20 or the generator 15. The exciting coil 23 of the clutch is wound about the central core as indicated in the drawing and the terminals engage two slip rings 24 respectively which are mounted upon and carried by the clutch element 20, or its shaft. The use of a plurality of independently movable armatures, each of comparatively light weight, gives many advantages.

The batteries to be charged are indicated in two different sets, the upper set 25 being connected to the two lower central contacts of a four-pole double-throw switch 26, and the lower battery set 27 being connected to the two upper central contacts of this switch. At 28 is indicated an automatically responsive electro-magnet having a series coil 29 and a pivotally mounted armature or contact lever 28' normally held in the position shown against a fixed contact 31 by means of a spring 30. When the current passing through the coil of magnet 28 becomes excessive, the armature 28' will be attracted and turned upon its pivot against the action of the spring 30, breaking the circuit passing through the fixed contact 31, armature or contact lever 28', and from its supporting part to the conductor connected thereto. This movement of the armature is limited by a pin or other stop 31', and when the current in the coil of the magnet is sufficiently reduced, the circuit will be again closed by the action of the spring overcoming the magnetic force of the magnet. At 32 is indicated another automatically responsive electromagnet having the pivotally mounted armature in the form of a contact lever 32'. This contact lever is held open against the pin or stop 31' by the action of the spring 30' until the magnetic pull upon the armature 32' is sufficient to overcome the force of the spring, and the armature or contact lever then makes contact with the fixed contact 33, closing the circuit through this fixed contact, the armature or contact lever 32' and through the support of the lever to the conductor connected thereto. This electro-magnet 32 is provided with a potential or shunt winding 34 and preferably an additional series winding 35, and although the windings are shown displaced, it will be understood that they may be superimposed or otherwise related as desired.

It will be observed that the shunt winding 34 is permanently connected across the terminals of the dynamo armature 15, and therefore is responsive to the voltage of this dynamo armature 15. When the dynamo voltage rises to a predeterminable amount, this voltage winding 34 automatically effects the closure of its coöperating switch 32', which switch is in the path of the total work current. In this specific form of my invention which employs the magnetic clutch, for the purpose of controlling the main circuit of the dynamo and its shunt field winding 15', as well as the circuit of coil 23 of the electro-magnetic clutch, I provide a seat switch which is adapted to be closed when the operator of the vehicle takes his seat in the vehicle. This is in the form of a conducting plate 36 supported upon an insulating block and adapted when depressed to engage the fixed contacts 37. Suppose the switch 26 is closed to the left. This connects battery 25 through the two lower blades 26 to the circuit of the dynamo shunt field and the magnetic clutch coil while battery 27 is connected through the two upper blades of 26, and the cross connection 26, to the ignition circuit leading to 44 containing the induction coil.

The clutch circuit and shunt field being energized by the closure of the seat operated switch 36, and the gasolene motor being in operation, the voltage of the armature 15 rises until finally the switch 32' is automatically closed by the voltage coil 34. This establishes the charging circuit and the dynamo charges the battery as follows: From one terminal of the generator 15 marked plus (+) the main circuit may be traced through the overload coil 29, series coil 35 to contact 33, and when the contact lever 32' is attracted by the magnet 32, the operator having previously closed the seat switch 36, the circuit will pass through this lever to the conductor connected to its support, through an adjustable resistance 38 to one of the contacts 37, and thence through the plate 36, when this switch is closed by the operator, to a conductor leading to the next to the lower fixed contact at the left of the double-throw switch 26. When this switch is thrown to the left the circuit will continue through one of the blades of the switch to one of the middle contacts, thence through the battery set 25 to the lowest middle contact, and thence through a switch blade to the lowest fixed contact at the left, and then by a conductor back to the negative terminal of the generator armature 15. It will thus be seen that when this main circuit is closed as described, one of the battery sets is connected in series with the armature 15 of the charging dynamo, and that this main circuit or work circuit comprises any of the lamps or other translating devices which may be turned on. It will also be seen that when the double-throw switch 26 is closed to the left, as above referred to, and the plate 36 is brought against the fixed contacts 37 by the operator, the circuit of the field winding 15' of the generator will be closed from say the negative terminal of the battery set 25, which latter is connected by switch 26 to the negative terminal of the armature 15, through the field coil 15' and an adjustable field resistance to one of the contacts 37, then to the plate 36 and thence to the positive terminal of the battery set 25, through the switch 26. It will be also seen that when the switch 26 is closed to the left and the plate 36 is in contact with the contacts 37, that a circuit extends from the negative terminal of battery set 25 through the switch 26 to fixed contact 31, thence through the contact lever 28' to the conductor connected to its support, thence through one of the collector rings 24 to the magnetic winding 23, then to the other collector ring 24 to one of the contacts 37, thence through plate 36 and through switch 26 to the positive terminal of battery set 25. Thus, under normal operating conditions, the circuit of this magnetic coil is connected in shunt across the dynamo armature and in parallel with the work circuit relative to the dynamo armature.

As above pointed out, the circuit between the armature 15 and the battery set 25 is not closed even when the switch 26 is thrown to the left, and even if the plate 36 makes contact with the fixed contacts 37, unless the contact lever 32' is automatically closed against the fixed contact 33. The final closing of this circuit is controlled by the potential winding 34 of the electromagnet 32, the path of this winding being from the positive terminal of armature 15 through the series windings 29 and 35, thence through the potential winding 34 and thence by a conductor to the negative terminal of the armature 15. It will thus be seen that this winding 34 is directly subjected to the electromotive force generated by the armature 15, and the contact lever 32' will not be closed until the electromotive force of the armature 15 is sufficiently high to cause the coil 34 to attract its armature. This magnet thus insures that the armature circuit will be closed upon the battery 25 only when the electromotive force of the armature, due to its speed and field strength, is of a sufficient amount to charge the battery set, and when from any cause this electromotive force is not sufficiently high, this main circuit will be interrupted by the action of the spring 30' overcoming the magnetic pull of the electromagnet 32. The series coil 35 serves to insure a firm contact when the switch is closed by the increased pressure due to the increased magnetic effect after the switch is closed, and also acts to insure the opening of this voltage switch in case the charging current should happen to reverse, as this would make the action of the series coil differential to that of the shunt or potential coil 34.

Continuing the description of the apparatus indicated in Fig. 1, it will be noted that when the switch 26 is closed to the left, current will be supplied through this switch from the battery set 25, or from the generator armature 15 when its main circuit is closed, to the circuit supplying the electric head lights 40 and tail light 40'. In the circuit of these translating devices I introduce a double pole single throw switch 41 adapted to engage either one of two fixed contacts between which latter a resistance 42 is connected. The path of this circuit may be traced from the positive terminal of battery set 25 through switch 26 to switch 41, and when the latter is closed to engage the upper contact, the circuit continues directly to one main supplying the lamps, then through the lamps shown connected in parallel with each other to the return wire and thence to the negative terminal of the battery through switch 26. When the switch 41 is thrown so as to engage the lower fixed contact connected to resistance 42, the path of the lamp circuit will be the same as before except the resistance 42 will be connected in series therewith causing the lights to be comparatively dim which will be more desirable in going through cities or towns, as distinguished from the brighter light desired in traveling over poorly lighted roads, and in the latter case the resistance 42 is cut out by closing the switch 41 through the upper fixed contact. In addition to the battery and the lamps, the work circuit may also comprise various other translating devices such as the electric heater 43, the electric horn 43', etc., as desired.

It will be noted that when switch 26 is closed to the left, battery 27 will be connected to the two upper left hand fixed contacts from which extends a circuit for supplying the energy for the electric ignition in the gas engine. This ignition may be of any desired type and controlled by any of the usual devices, and I have therefore indicated this ignition circuit as leading to a box 44, containing the customary one or more induction coils, contact breakers, etc. I preferably supply the ignition circuit from a battery set 27 independent of the battery 25, and independent of the circuit of various other translating devices and of the charging dynamo 15 so that energy supplied to the ignition circuit will be uniform and less likely to fail by reason of any derangement of the translating devices or of the automatic controlling means upon the charging circuits, and because this arrangement keeps the work circuit free from the customary ground connection used on the ignition circuit, thus increasing the reliability of service in case an additional accidental ground on the opposite pole. Moreover, with the translating devices connected in the circuit containing the dynamo 15 and the battery 25, much of the energy consumed by these translating devices will pass directly to them from the generator and any needed additional energy will flow from the battery. By means of switch 26, however, the battery set 25 may be caused to supply the ignition circuit and the battery set 27 will then be connected to supply the lamps and other translating devices and to the circuit of the charging generator 15. Thus, when the switch 26 is thrown to the right, it will be seen by tracing the circuits that battery 25 will supply the ignition circuit and battery 27 will be connected to supply other translating devices and being connected in circuit with the charging dynamo 15 will be subjected to the automatic control of this circuit by the electromagnetic switches 28, 32. Thus, by this switch 26, the batteries can be interchanged on the circuits as desired and may be connected to be charged by the charging dynamo when desired. This arrangement results in greater reliability of service, ease and simplicity of testing in case of any trouble and a ready means of comparing the condition of the two batteries.

The box containing the batteries will be located in any convenient location on the vehicle and the automatic electromagnetic switches, switch 26 and other controlling switches will preferably be mounted together upon an easily accessible panel and properly inclosed for protection.

In operation, the switch 26 will be closed to the left or to the right and one set of batteries will then supply the ignition circuit and the other the various translating devices. When the operator causes switch 36 to engage the fixed contacts 37, and assuming that the engine is operating, the circuit of the magnetic clutch coil 23 will be closed through one of the battery sets by means of switch 26, and the closure of this circuit will cause the armature 21 to be attracted by the other element of the clutch and so cause the rotation of the generator 15. Whenever the electromotive force generated by the armature 15 attains a suitable value adapted for connection to the battery circuit, the potential winding 34 of the electromagnetic switch 32 will cause the magnet to attract its movable armature and close the circuit through the battery and armature 15 as above explained. I have indicated the tension of spring 30' as being adjustable so that the armature 32' will be attracted when the electromotive force of the armature 15 attains a proper amount. When the electromagnet 32 is deënergized from any cause, or the electromotive force of the circuit becomes undesirably low, or in case a reversed current through the series coil 35 should occur so as to decrease the magnetization to such an amount that the spring 30' overcomes the magnetic attraction, the charging circuit will be interrupted and not closed again until the electromotive force of the generating armature is sufficient to cause the contact lever 32′ to be again attracted. The electromagnetic switch 28 serves to automatically control the energy delivered by the generating armature so that it will not exceed a predetermined amount and protect the batteries from an excessive charging current and also in cases where this is necessary to limit the speed of the dynamo to a proper amount irrespective of the speed of the driving engine. Thus, if, during operation, the electromotive force of the generator should become so high as to cause the current to be more than a predetermined amount, the coil 29 will cause the contact lever 28′ to be attracted and so break the circuit of the clutch coil 23. This will at once cause the voltage of the generator to decrease and so cause the current in the circuit containing the winding 29 to be decreased until the strength of the magnet 28 is reduced to such an amount that the contact lever 28′ is released. This release causes the circuit of the magnetic winding 23 to be automatically closed again, which in turn causes the current from the generating armature to rise again to its maximum. This automatic control of the magnetic winding by the automatic switch 28′ continues to take place as often as conditions are such as to require this automatic control as above explained. After the voltage of the dynamo has risen enough to effect the automatic closure of the low voltage switch 32′, the speed of the motor can be increased to a predetermined amount before the automatic switch 28′ responsive to the change in the electrical conditions of the armature circuit will respond to reduce the voltage of the dynamo. The increase of speed needed to effect the automatic opening of this automatic switch 28′ can be controlled and adjusted as desired. One form of control is indicated by the variable resistance 38. By inserting more resistance in 38 the range in speed of the dynamo before the automatic switch 28′ is opened, can be increased and modified as desired. My preferred way is by suitably adjusting the variable resistance 38. The switch 28′, after opening, will cause the voltage of the dynamo to be reduced until finally the magnetic pull due to the coil 29 will become less than that of the spring 30. Then the switch 28′ will be automatically closed again by the spring 30; the voltage of the dynamo will then again rise and again fall and this will continue indefinitely. The voltage impressed upon the charging circuit therefore fluctuates from a certain maximum to a certain minimum, but on account of the steadying action of the storage battery these wide and rapid fluctuations of energy in the charging circuit are equalized by the battery so as to keep the voltage on the lighting circuit satisfactorily constant. The magnetic winding 23 being a shunt winding across the dynamo armature 15 and the dynamo armature voltage being preferably low in amount, there is no detrimental spark at contacts 31, 31′, which are preferably of some arc resisting material such as platinum. At a certain speed of the motor the automatic switch 28′ will rythmically and automatically open and close and thereby cause unidirectional fluctuating amounts of charging energy to be delivered to the battery. As the speed of the motor varies from such a certain speed the length of time the switch remains closed, compared with the length of time it remains open, varies. When the speed of the motor is such that this switch is just beginning to act automatically, the period of closure is large compared with the period of opening. As the motor speed increases the period of closure becomes less and the period when it is open becomes greater, when compared with the total period of time. By varying the magnetizing time element of the field winding of the dynamo by well known methods and means, I can control these unidirectional energy fluctuations within limits.

By charging a battery in accordance with my invention, the battery is maintained in a very efficient condition. The rapid variation of the charging energy and the frequent slight discharge consequent upon the operation of the electric horn, electric lights, and other devices, tends to efficiently form the active matter of the battery, and prevents the formation of detrimental chemical compounds.

In Fig. 1, I have described the switch 36 adapted to engage contacts 37 as being closed by the operator when he takes his position in the car. Instead of this switch being controlled in this way, the same circuits may be arranged to be closed by the operator when he moves the gear lever into running position. In Fig. 2, the gear lever 44 is shown working in the slotted plate 44′ of the usual type, such as the plate in the form of an H for selective control of the change gears. On an extension of this hand lever is arranged a conducting strip 45, which when the lever is thrown forward or backward from the central position, will cause the conducting strip 45 to engage with a set of three contacts 46 at the right or with three similar contacts 46′ shown at the left. The fixed contacts opposite each other are shown electrically connected together so that the same electrical connection will be made whether the gear lever be moved forward or backward. From each of the three pair of contacts a conductor extends and which will be connected to the other apparatus the same as the conductors extending from the switch plate 36 and fixed contacts 37 of Fig. 1; that is, the upper pair of contacts of Fig. 2 correspond say to plate 36, the middle pair correspond say to the right hand fixed contact 37, and the lower pair correspond to the left hand fixed contact 37 of Fig. 1. Thus, the same electrical connections are attained by the arrangement of Fig. 2 except that the connection of these contacts is dependent upon the throwing of the gear lever into an operating position instead of being dependent upon the operator taking his position in the machine. Of course various other arrangements of circuit and controlling devices could be utilized and be within the scope of my invention.

My novel method of control, in the particular form described herein, produces a current the average amperes of which are substantially constant, irrespective of the voltage of the battery and irrespective of whether some of the lamps are turned on or not. The current supplied to the battery and lamps jointly, will rapidly fluctuate between a certain predeterminable maximum and a certain predeterminable minimum and these fluctuations of current act through the coil 29 and its coöperating automatic switch 28' so that they automatically control the rate of production of these fluctuations or waves of unidirectional energy. Thus, in the specific form described if the speed of the prime motor is comparatively low the number of such waves per second will be low, and as the speed of the prime motor increases the number of such waves per second increases. But with the battery connected across the dynamo armature these fluctuations are absorbed so as not to be noticeable in the lamps. This is due to the low ohmic resistance of the battery and the fact that its principal opposition to the flow of current is due to its counter volts, hence even a considerable fluctuation in the value of the charging current has but little effect in changing the voltage across the battery terminals which is the voltage of the lamp circuit.

As illustrating the performance of my invention in practice in the form described, suppose that charging current is adjusted by means of the spring 30 until the current as read by an ampere meter in series with coil 29 is 10 amperes. That is 10 amperes is the integration of the rapid fluctuations of the current. Now suppose no lamps are turned on. Then 10 amperes is passed through the battery. If now lamps are turned on requiring 6 amperes the current through the battery automatically becomes 4 amperes. Similarly if more lamps be turned on until 10 amperes are taken by the lamps the current through the battery becomes 0. That is the total current through coil 29 is automatically controlled by coil 29 to maintain the current constant and whatever current is needed for the lamps is automatically subtracted from the total and the balance goes through the battery. Thus if the lamps and signal horn take 15 amp. the dynamo still automatically produces 10 amp. and 5 amp. flows as a discharge current from the battery.

My novel method of controlling the output of the armature 13 and charging the battery produces many new and useful results. The size of armature 13 can be made smaller because the heating effect is definite and cannot be exceeded as in other systems. The tendency to sparking is greatly reduced because the maximum volts and amperes of the armature are in practice always kept below certain definite amounts. The wear of the brushes and commutator are consequently reduced to a minimum. The battery is kept fully charged and never subjected to a charging current in excess of the predetermined maximum charging current. The fluctuating charging current is very beneficial in its effects as compared to a steady current, one reason for this being probably the tendency to dislocation of the bubbles of gas, due to the fluctuating energy of the current.

Although I have illustrated my invention as applied to a vehicle driven by a gas engine, it will be evident that my invention can also be applied similarly to the charging of a battery when the source of mechanical energy is the axle of a railway car, in which case the car axle will serve to drive the charging dynamo instead of the gas engine referred to in connection with Fig. 1. The source of mechanical energy may in some cases be a wind mill, or the energy may be derived from an elevator, or from a moving platform, or from the rise and fall of water as will change of tide, or from the rise and fall due to waves, and in general from any of the sources of energy which might be utilized for driving the charging dynamo.

Although I have described certain embodiments of my invention, it will be understood that the methods and arrangements may differ in various other embodiments of my invention without departing from the scope thereof, as defined in the appended claims.

Having thus described my invention, what I claim as new and desire to secure by Letters Patent of the United States is:—

1. The method of charging a storage battery which consists in generating by magnetic induction unidirectional electric energy, and controlling the energy according to the amperage to vary the amperes from a certain minimum to a certain maximum, thereby producing rhythmic fluctuations in the battery charging energy, while maintaining the average effect of the current constant independently of the voltage of the battery.

2. The method of controlling a work circuit comprising a storage battery with incandescent lamps in parallel therewith, which consists in increasing the voltage until the current in the work circuit reaches a certain maximum, then reducing the voltage until the current in the work circuit reaches a certain minimum, then increasing the voltage until the maximum condition is reached, and repeating the described cycle of operation in accordance with the amperes in the work circuit thereby maintaining a substantially constant average current in the total work circuit.

3. The method of controlling a battery charging dynamo driven at widely different speeds, which consists in controlling the energy supplied by the dynamo to the battery by rapidly opening and closing a controlling circuit and thereby controlling the energy output of the dynamo, said opening and closing being in accordance with changes between maximum and minimum limits of the energy of the dynamo.

4. The method of controlling the energy delivered by a dynamo armature to a work circuit across which are connected a storage battery and incandescent lamps in parallel with each other, which consists in rapidly moving a circuit controlling element to two definite different positions alternately in response to changes in the energy supplied from the armature to the work circuit, whereby rhythmic fluctuations of the energy in the circuit are produced.

5. The method of maintaining a current constant at a desired average rate, which consists in increasing the current to a certain maximum, controlling a circuit controlling element to reduce the current to a certain minimum, and then controlling said element to increase the current to said maximum, and repeating said steps as often as required to maintain the average current substantially constant.

6. The method of controlling the output of a dynamo electric armature, which consists in connecting the armature to a storage battery when its voltage reaches a predetermined value, controlling the energy in a work circuit connected across the armature and comprising said battery when the current supplied the circuit exceeds a certain maximum limit by reducing the output of the armature until a certain minimum current is reached, then controlling the output of the armature by increasing the output of the same until the said maximum current is again exceeded, and repeating the said steps successively.

7. The method of maintaining substantially constant the average rate of charging energy delivered to a storage battery by a dynamo armature driven at speeds varying over a wide range, which consists in fluctuating the rate of energy between a certain minimum and a certain maximum, and varying the percentage of time when the minimum current is in use as compared with the total time.

8. The method of controlling a current supplied to a circuit across which is connected a storage battery, which consists in rapidly fluctuating the voltage of a dynamo electric charging winding from a voltage materially higher than that of the battery to a lower voltage, and controlling the maximum limit of voltage in response to a maximum current, whereby a rapidly fluctuating current is produced while the average charging current is kept reasonably constant at a desired rate.

9. The method of controlling the current supplied to a circuit across which are connected in parallel a storage battery and incandescent lamps, which consists in producing mechanical power at widely different speeds, driving an electric generating device by such power, and supplying a series of rapidly recurrent fluctuations of unidirectional energy to the circuit between maximum and minimum amounts of energy.

10. The method of charging a battery at a predetermined number of average amperes, which consists in supplying to the battery a series of waves of energy, controlling the maximum amperage of such waves by controlling the voltage of the source of supply in response to a maximum charging current, and varying the rate of waves per second whereby the average amperage is maintained substantially constant.

11. The method of maintaining substantially constant the average watt output of a dynamo armature driven at widely different speeds, which consists in connecting the armature to a storage battery, increasing the voltage of the armature until the charging current reaches a predetermined maximum, then reducing the voltage of the armature, then again increasing the voltage until the charging current reaches said predetermined maximum, repeating the said cycle of operations and varying the number of such cycles per second in response to changes of speed of the source of power for the armature.

12. The method of operating incandescent lamps at a substantially constant voltage when the source of power has a widely variable speed, which consists in connecting said lamps across a storage battery, supplying the battery and lamps from a dynamo electric winding in waves of energy controlled according to the total current at a rate of waves per second dependent upon the speed of the variable speed source, whereby the average current supplied is substantially independent of changes in the speed of the source of power.

13. The method of charging a battery which consists in generating electric energy by magnetic induction, supplying energy to the battery and increasing the voltage of the energy until the amperes reach a predetermined maximum, then reducing the voltage of the energy, then increasing the voltage until the amperes again reach the said maximum and repeating the stated cycle of operation, whereby the charging energy is produced in a series of controlled re-current fluctuations, whose effective value is that of a constant current.

14. The method of controlling a battery charging current which consists in causing the current to rise to a predetermined amount, then reducing the current in response to said maximum current, then again increasing the current to the said maximum and again reducing it in response to said maximum current.

15. The method of controlling a battery charging current which consists in increasing the charging energy until a predetermined maximum electrical condition of the charging circuit is reached, then reducing the energy in response to said maximum condition, then again increasing and decreasing the energy as described and repeating the stated steps.

16. The method of controlling storage battery charging energy which consists in generating unidirectional energy, and causing the charging energy to control itself so as to produce a series of rapidly recurrent fluctuations of uninterrupted unidirectional energy.

17. The method of controlling electric energy which consists in producing unidirectional energy, and causing the energy produced to control the source of energy so as to produce a series of rapidly recurrent fluctuations of uninterrupted unidirectional energy.

18. The method of controlling the current supplied to a circuit containing a storage battery and incandescent lamps in parallel with each other which consists in dynamo-electrically generating current, passing said current through the circuit, fluctuating the current by increasing the current until a certain predetermined maximum is reached then reducing the current until a certain predetermined minimum is reached and so varying the rate of fluctuations per second as to maintain a substantially constant average current, irrespective of a wide change of speed of the source of power, irrespective of the voltage of the battery and irrespective of the number of lamps in use.

19. The method of controlling the current supplied by a dynamo armature to a storage battery and to incandescent lamps connected in parallel across the terminals of the battery, said battery having its electromotive force opposing that of the armature, which consists in suddenly increasing the voltage generated by the armature until the current supplied thereby reaches a certain maximum, then suddenly reducing the armature voltages until the current supplied by the armature reaches a certain minimum, then suddenly increasing the voltage generated by the armature as before, and repeating the sudden increase and decrease of voltage according to said changes in current supplied by the armature, whereby the current supplied by the armature is maintained at the desired average amount without substantially varying the voltage across the battery and lamps.

20. The method of controlling the current in a circuit, which consists in developing two electromotive forces in a circuit which are opposed to each other, one of which is substantially constant and the other of which is variable and alternately increasing and decreasing the variable voltage in accordance with change of the current while maintaining the variable voltage above that of the constant voltage, whereby the flow of current is maintained at a substantially constant average amount.

21. The method of controlling the current supplied to a plurality of incandescent lamps in parallel with each other and to a storage battery in parallel with said lamps, which consists in supplying a substantially non-fluctuating current through said lamps, supplying fluctuating current through said battery, the said fluctuating current being fluctuated between a certain maximum and a certain minimum value alternately, and controlling said fluctuating current according to changes in the total current supplied to said battery and said lamps, the time intervals between the fluctuations being controlled to cause the average total supplied to the battery and lamps to be substantially constant.

22. The method of applying a desired average current from a dynamo armature to a plurality of incandescent lamps and a storage battery in parallel with each other, which consists in rapidly increasing the voltage of the dynamo until the current in the circuit reaches a certain maximum greater than the desired average current, then rapidly reducing the voltage of the dynamo until the current in the circuit reaches a certain minimum less than the desired average current, and repeating this cycle of operations with such a frequency as to produce the desired average current.

23. The method of supplying current from a dynamo to a group of translating devices connected in parallel with each other and one of said devices having low ohmic resistance and a substantially constant counter electromotive force, which consists in rapidly and alternately increasing and decreasing the voltage of the dynamo in accordance with the change of the total current between a certain maximum and a certain minimum supplied to said devices, whereby the average total current is maintained substantially constant and the voltage across the devices is maintained substantially constant.

24. The method of controlling the output of a dynamoelectric armature, which consists in connecting the armature to a storage battery when its voltage reaches a predetermined value, controlling the energy in a work circuit connected across the armature and comprising said battery when the energy supplied the circuit exceeds a certain maximum limit by reducing the output of the armature until a certain minimum output of energy is reached, then controlling the output of the armature by increasing the output of the same until the said maximum energy is again exceeded, and repeating the said steps successively.

In testimony whereof I affix my signature, in presence of two witnesses.

HARRY WARD LEONARD.

Witnesses:
CAROLYN G. LEONARD,
HARRY BOILLOTAT.